United States Patent

Angeleri et al.

[15] 3,659,226

[45] Apr. 25, 1972

[54] DIGITAL FREQUENCY MODULATOR

[72] Inventors: Emanuele Angeleri; Fabio Balugani, both of Milan, Italy

[73] Assignee: Societa' Italiana Telecomunicazioni Siemens S.p.A., Milan, Italy

[22] Filed: May 11, 1970

[21] Appl. No.: 36,252

[30] Foreign Application Priority Data

May 12, 1969 Italy ................................16727 A/69

[52] U.S. Cl. ....................................332/9, 178/66, 325/163, 328/63, 328/158, 332/10

[51] Int. Cl. .........................................................H04l 27/12

[58] Field of Search ...................332/9, 9 T, 10; 325/30, 163; 178/66; 328/63, 158

[56] References Cited

UNITED STATES PATENTS 2,994,790 8/1961 Delaney ................................332/9 X 3,426,296 2/1969 Christiansen et al. ....................332/9

*Primary Examiner*—Alfred L. Brody

*Attorney*—Karl F. Ross

[57] ABSTRACT

Two pulse trains with harmonically related repetition frequencies $1/T_o$, $1/nT_o$ are derived from an original square wave of cadence $2/T_o$, the pulses of each train having the width $T_o/4$ of the square-wave pulses. With the aid of a second square wave of cadence $T_o$, produced by frequency halving from the original square wave, the two harmonically related pulse trains are additively or subtractively combined so as to produce an irregular pulse sequence with n±1 pulses in each period $nT_o$ of the lower-frequency train. A digital pulse counter derives from this irregular pulse sequency a low-frequency square wave converted, by filtration, into its fundamental sine wave whose frequency can thus be selectively varied, with only minor phase discontinuities, between three predetermined values related to one another as (n+1) : n : (n−1). In an alternative embodiment, the keying frequencies are related to the basic frequency as (2n+1) : 2n : (2n−1). The two pulse trains are generated by progressive frequency division, starting with the original square wave, and selective gating.

10 Claims, 6 Drawing Figures

INVENTORS:
EMANUELE ANGELERI
FABIO BALUGANI
BY
Karl F. Ross
ATTORNEY

INVENTORS:
EMANUELE ANGELERI
BY FABIO BALUGANI
Paul G. Ross
ATTORNEY

INVENTORS:
EMANUELE ANGELERI
FABIO BALUGANI
BY
Karl F. Ross
ATTORNEY

INVENTORS:
EMANUELE ANGELERI
FABIO BALUGANI
BY Karl F. Ross
ATTORNEY

| W | X | Y | Z | $F_o$ (kHz) | A (kHz) | B (kHz) | C (kHz) | D (kHz) | F (kHz) | F' (Hz) | F'' (Hz) |
|---|---|---|---|---|---|---|---|---|---|---|---|
| 1 | * | 0 | * | 320 | | +20 | | −80 | $F_1$ = 260 | 1300 | |
| 1 | 0 | 1 | * | | | +20 | | | $F_2$ = 340 | 1700 | |
| 1 | 1 | 1 | * | | | +20 | | +80 | $F_3$ = 420 | 2100 | |
| 0 | * | * | 1 | | +10 | | +40 | +80 | $F_4$ = 450 | | 450 |
| 0 | * | * | 0 | | −10 | | | +80 | $F_5$ = 390 | | 390 |

INVENTORS:
EMANUELE ANGELERI
FABIO BALUGANI
BY Karl F. Ross
ATTORNEY

INVENTORS:
EMANUELE ANGELERI
FABIO BALUGANI

BY Karl F. Ross
ATTORNEY

DIGITAL FREQUENCY MODULATOR

Our present invention relates to a circuit arrangement for generating two or more different frequencies for the transmission of information, e.g. in telegraphy where the alternation between two predetermined frequencies signifies marks and spaces, respectively.

Since the switchover from one signal frequency to the other is generally carried out at intervals unrelated to these frequencies, conventional modulators used for this purpose introduce considerable phase shifts along with the frequency variation so as to give rise to spurious amplitude modulations with introduction of undesired sidebands. With high-speed signaling, in particular, these unwanted sidebands may assume considerable amplitudes.

It is, therefore, the general object of our invention to provide an improved modulator designed to facilitate the changeover, at any time, between two predetermined but, ordinarily, mutually unrelated frequencies with substantial continuity of phase in response to switching impulses or keying signals of a binary nature.

A more specific object is to provide a modulator of this type utilizing logical networks capable of realization by integrated circuits, owing to the elimination of all inductances used in conventional oscillation generators.

It is also an object of our invention to provide a modulating system of this description of high frequency stability superior to that realizable with conventional time-constant networks of the resistance-capacitance type.

A digital frequency modulator embodying our present invention comprises a source of equispaced pulses constituting a basic pulse train, this source advantageously including a square-wave oscillator whose output (termed hereinafter the original square wave) is fed to a frequency-dividing network deriving from that output a regular succession of pulses with a cadence subharmonically related to the frequency of the original square wave. A modulating pulse train, which may be derived from the same original square wave with the aid of another portion of the frequency-dividing network, has pulses recurring with a cadence harmonically related to that of the basic pulse train; in a limiting case, the two cadences may be identical. The superposition of one pulse train upon the other, with proper relative phasing, results in a modified pulse sequence with a number of pulses per unit of time algebraically related to the cadences of these two pulse trains; depending on whether the two pulse trains are combined additively or subtractively, the mean pulse cadence in the modified sequence represents the sum or the difference of the two individual cadences. This superposition is carried out by logical circuitry working into output means designed to convert the modified pulse sequence into a symmetrical wave, square or sinusoidal, of a frequency determined by the mean cadence of that sequence, i.e. by the number of pulses per unit of time. The output means may comprise a digital pulse counter having a final stage which is alternately switched between its two conductivity states upon the count reaching a predetermined value, thereby generating a square wave of a frequency substantially lower than that of the original square wave and not necessarily related thereto harmonically; this final square wave, in turn, can be converted into a sine wave with the aid of a simple low-pass filter eliminating all higher harmonics so as to isolate only the fundamental.

In the aforementioned limiting case, in which the cadences of the basic pulse train and the modulating pulse train are the same, the additive combination of the two trains would result in a pulse sequence of twice that cadence, provided that the pulse width of each train was less than half its repetition period and that the two trains were relatively dephased to a sufficient extent to prevent a fusion of their pulses. Upon subtractive combination, of course, the resultant pulse frequency would be zero if the two trains were exactly in phase at the time of superposition.

In the more general case contemplated by us, and in accordance with a preferred mode of realization of our invention, the modulating pulse train consists of a series of keying pulses of a width substantially smaller than half their recurrence period, these keying pulses being derived from different stages of the frequency-dividing network with the aid of coincidence circuits including AND (or NAND) gates and/or equivalent NOR gates. The basic pulse train, in this case, may be a square wave of a frequency $1/T_o$ equaling half the frequency of the original square wave, derived from the latter with the aid of a bistable divider stage. The keying pulses, recurring at a substantially lower frequency $1/nT_o$ subharmonically related to that of the basic pulse train, should then have a width not less than $T_o/2$ nor greater than $3T_o/2$ so as to range between one and three times the pulse width of the second square wave. The additive or subtractive superposition of such a keying pulse, properly phased, upon the basic pulse train alters the number of pulses occurring in that train during any period $nT_o$, as by blanking out one of the original pulses of that train or merging two such pulses into one. By further beating this modified pulse sequence with the original square wave, with the aid of an additional coincidence gate, we can produce a series of irregularly spaced output pulses of width $T_o/4$ and with a mean cadence either larger or smaller than that of the original pulse train.

A similar result can be achieved, pursuant to another feature of our invention, if the pulses of the basic and modulating trains have the same width and if, upon the occurrence of any keying pulse, the switching of the flip-flop generating the basic pulse train (normally a square wave of frequency $T_o$) is inhibited so that the pulses of that train are delayed by an interval $T_o/2$ for each keying pulse. Upon the formation of the logical sum of these delayed pulses and the keying pulses giving rise to the delay, the ratio between the total pulse width and the total pulse spacing during unit time is increased or reduced, depending again on the relative polarity of the pulses. By selectively inverting these keying pulses, i.e. by reversing their phase with reference to the outputs of the flip-flop and the square-wave oscillator of frequency $2/T_o$, we can thus alternately raise or lower the mean pulse cadence of the final train and, with it, the frequency of the square of sinusoidal output wave derived therefrom with the aid of a pulse counter as described above.

These and other features of our invention will become more clearly apparent from the following detailed description given with reference to the accompanying drawing in which.

Figures 1, 8:
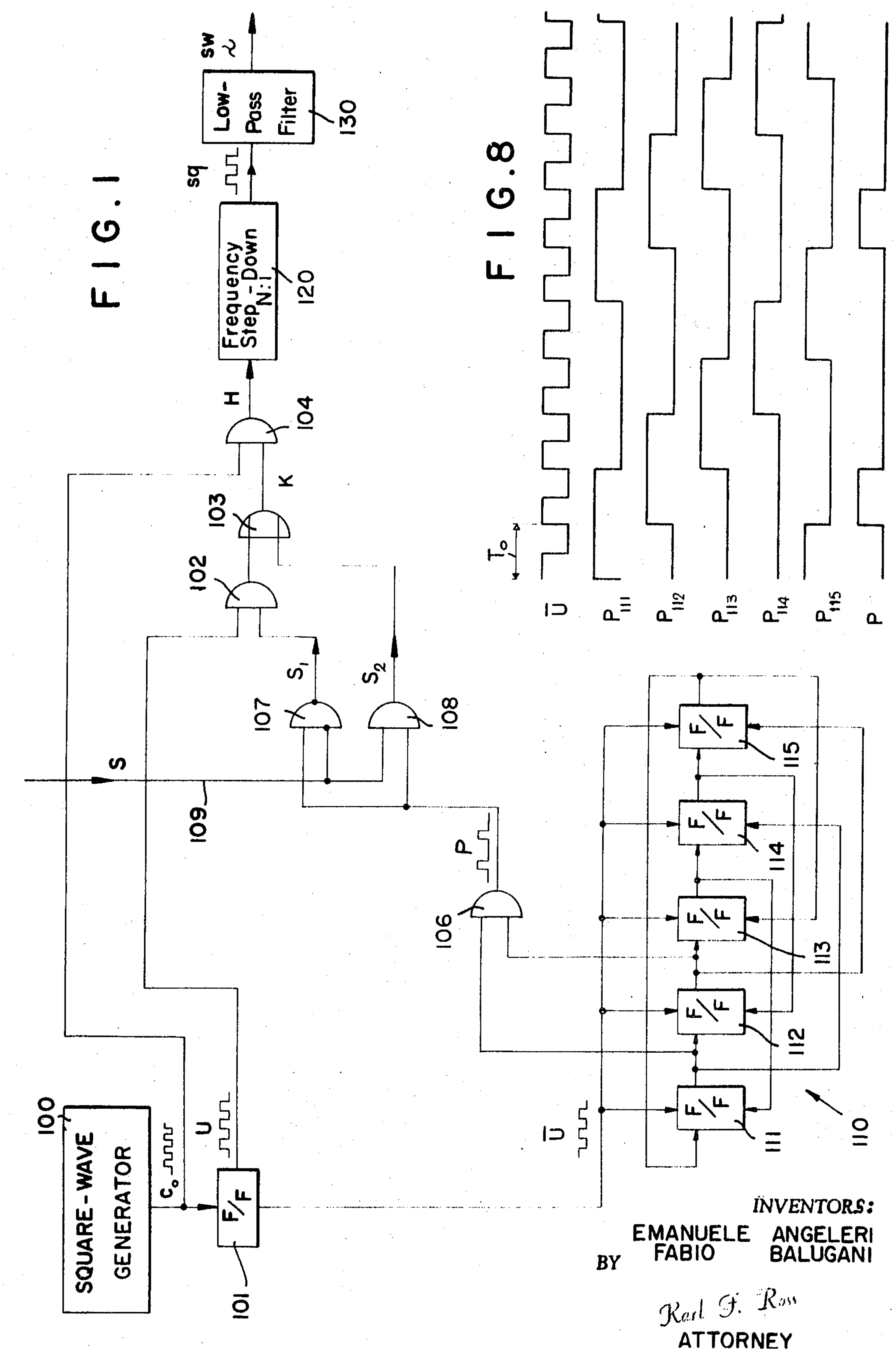
FIG. 1 is a circuit diagram of a digital frequency modulator embodying our invention.
FIG. 8 is a further set of graphs serving to explain the operation of a frequency divider shown in FIG. 1.

The system shown in FIG. 1 comprises a square-wave generator 100 of conventional type, such as a sine-wave oscillator followed by a squarer. The output $c_o$ of generator 100 is delivered, after differentiation if necessary, to a flip-flop 101 which is alternately set and reset by successive cycles of the square wave. The set output U of flip-flop 101 is applied to one input of an AND gate 102 working into an OR gate 103; the latter, in turn, feeds a further AND gate 104 which also receives the original square wave $c_o$ directly from generator 100.

The reset output $\overline{U}$ of flip-flop 101 is delivered to a frequency divider 110 comprising a cyclical pulse counter with five stages 111, 112, 113, 114, 115; the set outputs of stages 111 and 112 are logically combined in an AND gate 106 feeding a NAND gate 107 and an AND gate 108 in parallel therewith.

The two coincidence gates 107 and 108 have their second inputs tied to a lead 109 carrying a switching signal S; the resulting output signals $S_1$, $S_2$ of these gates are transmitted to AND gate 102 and OR gate 103, respectively.

Figure 2:
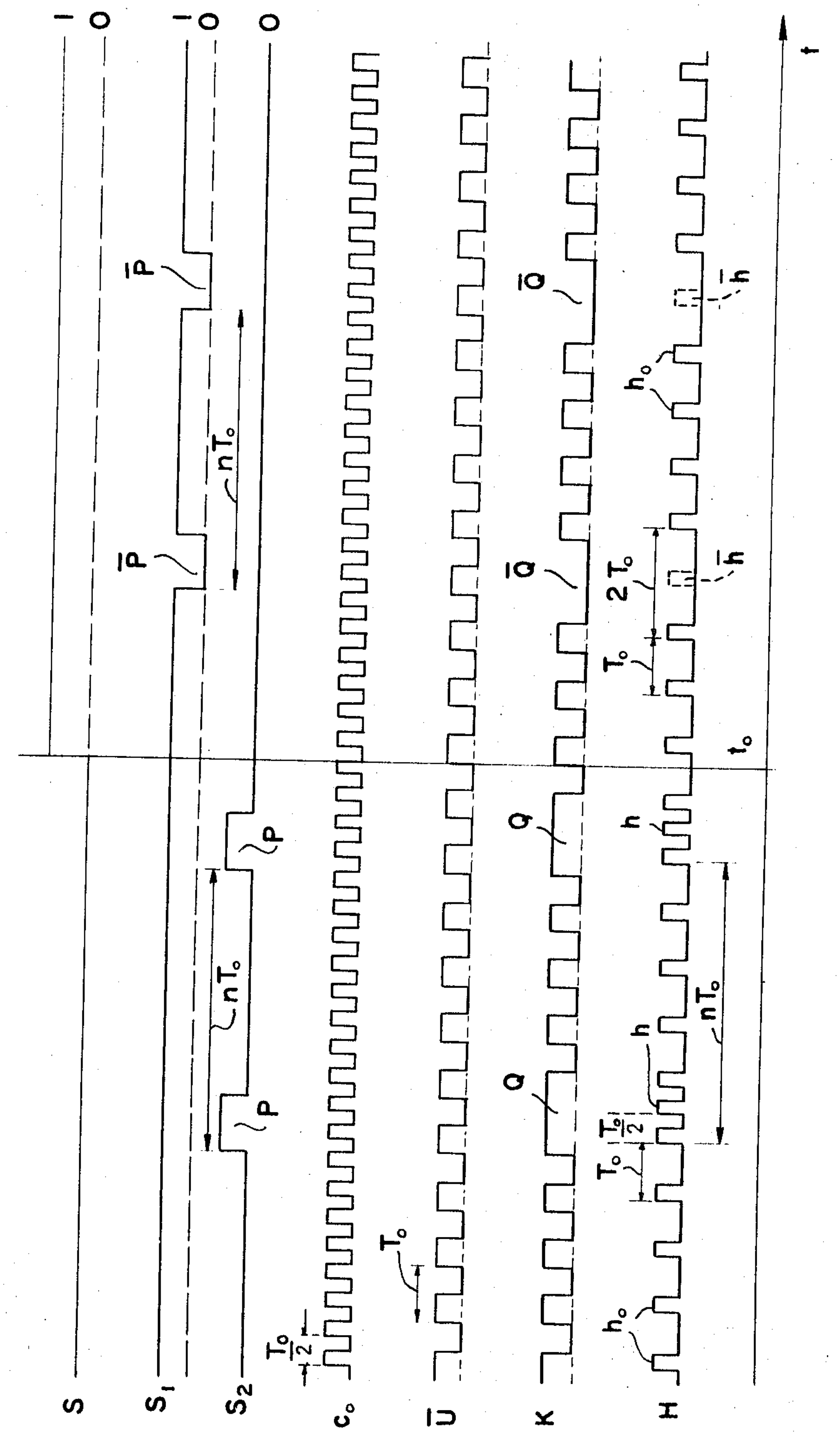
FIGS. 2 and 3 are two sets of graphs serving to explain the operation of the system of FIG. 1.

Reference will now be made to FIG. 2 for a discussion of the mode of operation of the digital frequency modulator shown in FIG. 1. The top graph of this Figure shows the input signal S which, it will be assumed, originally has the value 0 and switches to the value 1 at a time $t_o$. The next two graphs show the signals $S_1$ and $S_2$ issuing from gates 107 and 108, respectively. The fourth graph represents the square wave $c_o$, of frequency $2/T_o$ and period $T_o/2$, produced by generator 100. Beneath it is shown a second square wave $\bar{U}$, of frequency $T_o$, delivered by flip-flop 101; it will be noted that this signal, whose inverted replica U is fed to AND gate 102, is also a square wave of unit amplitude.

The signals $S_1$ and $S_2$ are composed of the input signal S and a series of keying pulses P delivered by AND gate 106, these pulses appearing directly in the output of gate 108 prior to the switchover time $t_o$ (S = 0) and in inverted form $\bar{P}$ in the output of gate 107 after the switchover (S = 1). Graph K of FIG. 2 represents the output of OR gate 103 resulting from the superposition of signals $S_1$, $S_2$ and $\bar{U}$. Prior to switchover, each pulse P produces a pulse Q of thrice the duration of each pulse of train $\bar{U}$; after switchover, each pulse $\bar{P}$ creates a gap $\bar{Q}$ of the same duration. Graph H shows an irregular pulse sequence emerging from AND gate 104 which combines the original square wave $c_o$ with the modified pulse sequence K; it will be noted that signal H is a sequence of pulses $h_o$ having the same width $T_o/4$ as the pulses of square wave $c_o$ and a cadence $1/T_o$ equaling that of wave $\bar{U}$ but with interleaving of an extra pulse $h$ at the location of each pulse Q and with omission of a pulse at a point $\bar{h}$ coinciding with each gap $\bar{Q}$.

The repetition period of successive keying pulses P equals $nT_o$ where $n$ is an integer; in the present example, $n = 5$. Consequently, a pulse $h$ occurs after every fifth pulse $h_o$, with a separation of $T_o/4$ from the preceding and the following pulse $h$. Conversely, the suppression of a pulse at $\bar{h}$ leaves a space of $7T_o/$ between successive pulses $h_o$.

The mean cadence of the pulse sequence H thus varies between a lower value $T_{om}' = nT_o/n + 1$ and a higher value $T_{om}'' = nT_o/n - 1$. With $T_o = 1/f_o$, the mean pulse frequency $f_m'$ (for $S = 0$) or $f_m''$ (for $S = 1$) is given as $f_m' = f_o\ (n + 1)/n$ and $f_m'' = f_o\ (n - 1)/n$.

Figures 5, 7:
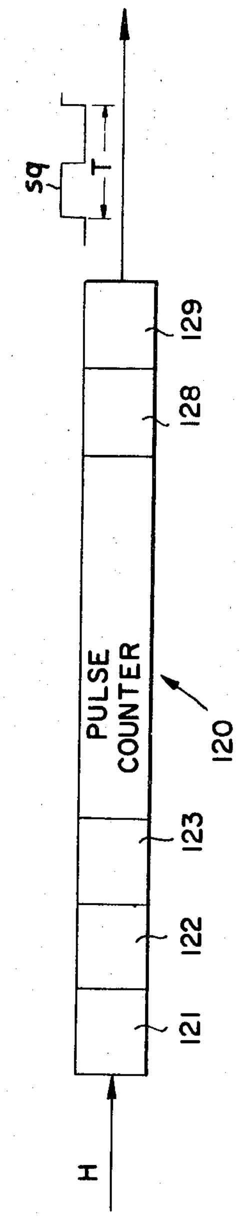
FIG. 5 is a table relating to the operation of the system of FIG. 4.
FIG. 7 is a block diagram of a frequency divider included in the embodiments of FIGS. 1 and 4.

As further illustrated in FIG. 1, the pulse sequence H is fed into a frequency divider 120 having a step-down ratio of N : 1; the output of this frequency divider, whose construction is shown more fully in FIG. 7, is a square wave $sq$ which is converted into a sinusoidal wave $sw$ by a low-pass filter 130. Frequency divider 120 comprises a multistage pulse counter with binary stages 121, 122, 123, . . . 128, 129.

The pulses $h_o$, $h$ of sequence H reach the first stage 121, the several stages being so interconnected that the penultimate stage 128 is switched with every $(N/2)^{th}$ pulse. Thus, the final stage 129 remains "on" for a succession of $N/2$ pulses and "off" for a like number of pulses whereby the length of a cycle of output wave $sq$ has a period encompassing $N$ pulses of wave H. Depending on the density of these pulses, i.e. the interleaving or the omission of some of them as illustrated in FIG. 2, the duration T of a cycle of wave $sq$ will be either shorter or longer.

Since the counter 120 returns to zero after every $N^{th}$ pulse, and since this zero-setting may occur at various times within a cycle $nT_o$ of pulse train P, the actual length of a cycle of wave $sq$ in the presence of a given switching condition $S = 0$ or $S = 1$ is subject to minor variations whose significance diminishes with increasing values of $N$. In the high-frequency condition ($S = 0$) this duration has an average value $T' = N'T_o$ with $N'$ ranging between $N - \Gamma(N/n) + 1$ and $N - \Gamma(N/n)$, the symbol $\Gamma$ denoting the integral part of the parenthetical term. Similarly, in the low-frequency condition ($S = 1$) the duration of a wave cycle has a value of $T'' = N''T_o$ with $N''$ ranging between $N = \Gamma(N/n) + 1$ and $N + \Gamma(N/n)$. If $\Delta T$ designates the differences between the maximum and minimum value of either $T'$ or $T''$, the relative magnitude of this difference in terms of the mean output period $T_m' = T_m''$ or $T_m'' = NT_{om}''$ is given by $$\Delta T/T_m' = n + 1/Nn \quad (1)$$

and $$\Delta T/T_m'' = n - 1/Nn \quad (2)$$

This relative difference, therefore, can be made as small as desired by the choice of a sufficiently large value of $N$.

If, for example, $n = 4$ and $N = 10$, equations (1) and (2) yield 7.5 percent and 12.5 percent for the proportional deviations $\Delta T/T_m'$ and $\Delta T/T_m''$, respectively.

Naturally, the frequency of output wave $sw$ should be high compared with the switching frequency (e.g. as expressed in bauds) so that the desired large value of $N$ calls for a substantially elevated frequency of the original square wave $c_o$.

Whereas FIG. 2 illustrates only two signaling conditions, i.e. $S = 0$ (high frequency) and $S = 1$ (low frequency), it will be apparent that a median signal frequency exactly corresponding to $1/NT_o$ could also be generated by the simple expedient of blocking the output of AND gate 106. The three output frequencies thus obtainable are related to one another by the ratio $(n+1) : n : (n-1)$.

Figure 3:
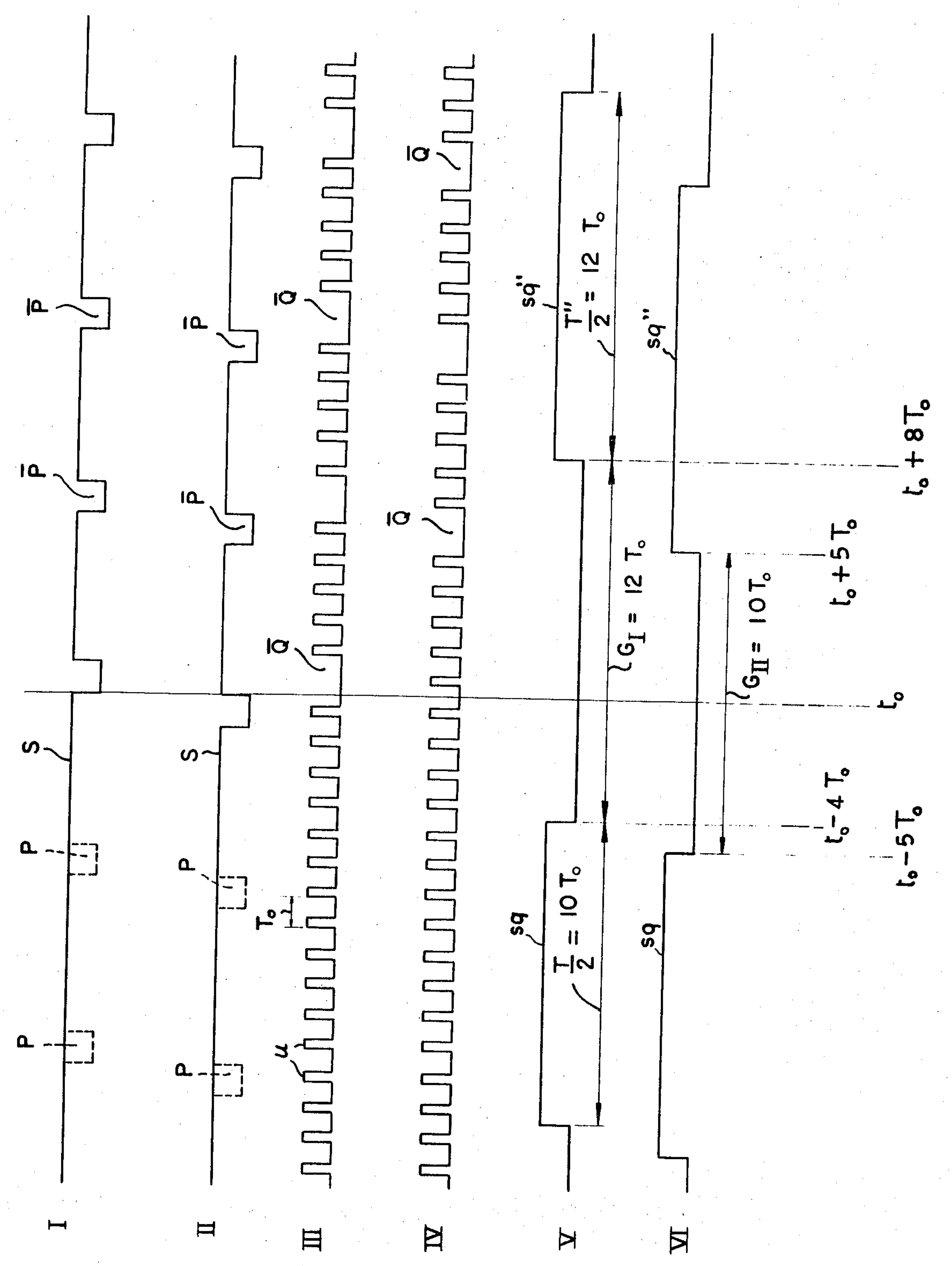

The transition from one signal frequency to the other, commanded by the signal $S$ and/or by a blocking signal applied to gate 106, occurs at intervals generally unrelated to these frequencies and to the cadence of keying pulses P. Thus, the switchover time $t_o$ will find the counter 120 by occasionally at the end of its operating cycle; in the more usual case a partial count will be stored therein at that instant and will be carried over into the new switching state. If time $t_o$ happens to coincide with the beginning of a counting cycle, the first cycle after the switchover will be of a length corresponding to the new signal frequency; otherwise, the length of this cycle may assume any of several discrete values between the period of the old and the period of the new output signal. This will be best understood with reference to FIG. 3 which, by way of example, represents the case of a switchover from the aforedescribed median output frequency (with gate 106 blocked) to the low-frequency output generated with $S = 1$ and with the aid of the inverted keying pulses $\bar{P}$ as described above in connection with the right-hand portion of FIG. 2. In FIG. 3, furthermore, the pulses $\bar{P}$ are shown to have a repetition period of $6T_o$ ($n = 6$), $T_o$ being again the period of the basic pulse train here shown to consist of equispaced pulses $u$ of a width substantially less than their spacing.

Graph (I) of FIG. 3 represents the case where the switchover, at time $t_o$, occurs just before the appearance of a pulse $\bar{P}$ which produces the first gap $\bar{Q}$ in the basic train of pulses $u$, graph (III).

As indicated in graph (V), the square wave $sw$ has a half-cycle of duration $T/2 = 10T_o$ so that $N = 20$. In the assumed case, the last pulse of this square wave before the switchover terminates at a time $t_o - 4T_o$ so that the count of 20 pulses $u$ is completed only at a time $t_o + 8T_o$, with intervention of two gaps $\bar{Q}$.

The length of the interval $G_I$ separating the last pulse of wave $sq$ from the first pulse of wave $sq''$, of length $T''/2 = 12T_o$, is therefore also equal to $12T_o$.

In the other extreme case represented by graphs (II), (IV) and (VI), the switchover time $t_o$ arrives just at the end of the last, ineffectual, keying pulse P; the last pulse of square wave $sq$ terminates at a time $t_o - 5T_o$ so that the count of 20 pulses $u$ is completed at a time $t_o + 5T_o$, thus before the occurrence of the first gap $\bar{Q}$. The width of the interval $G_{II}$ separating the last pulse of wave $sq$ from the first pulse of wave $sq''$, as shown in graph (VI), is in this case equal to $10T_o$, being thus equal to a pulse width of wave $sq$.

Between these two limiting cases there exists a more common situation in which only one gap $\bar{Q}$ has to be bridged to complete the count; the switchover interval will then have a length of $11T_o$. With a larger ratio of $N:n$, the number of possible values for this interval increases; in each case, however, the duration of the interval will lie in a range whose limits are the shortest and the longest possible pulse length of the higher and the lower signal frequency, respectively. Thus, the transition from one signal frequency to the other takes always place with minimum phase discontinuity.

FIG. 8 shows the operation of the frequency divider 110 of FIG. 1 generating the keying pulses P at a cadence corresponding to one-fifth that of the basic pulse train U. The pulses $\overline{U}$, shown in the top graph of FIG. 8, set the flip-flop 111 to produce a pulse $P_{111}$ in the output thereof; this pulse $P_{111}$ is applied to an enabling input of the previously reset flip-flop 112 which is then set by the next pulse U to produce a pulse $P_{112}$. The latter pulse, in its turn, enables the flip-flop 113 to generate a pulse $P_{113}$ in response to the third trigger pulse $\overline{U}$. In the same way, flip-flops 114 and 115 are successively set to emit pulses $P_{114}$ and $P_{115}$, the last-mentioned pulse again enabling the first flip-flop 111 to repeat the cycle.

Each flip-flop 111–115 also has a feedback connection from its set output to reset the next-but-one flip-flop preceding it in the chain. Thus, flip-flop 111 is reset by pulse $P_{113}$ of flip-flop 113 to limit the duration of its own pulse $P_{111}$ to a time $2T_o$. Pulses $P_{112} - P_{115}$ are similarly limited. The overlapping halves of pulses $P_{111}$ and $P_{112}$, by unblocking the gate 106, give rise to a keying pulse P as illustrated in the bottom graph of FIG. 8.

The frequency divider 110 is the subject of a commonly owned application, Ser. No. 36,026 filed May 11, 1970 by Piero Venturini.

Figure 4:
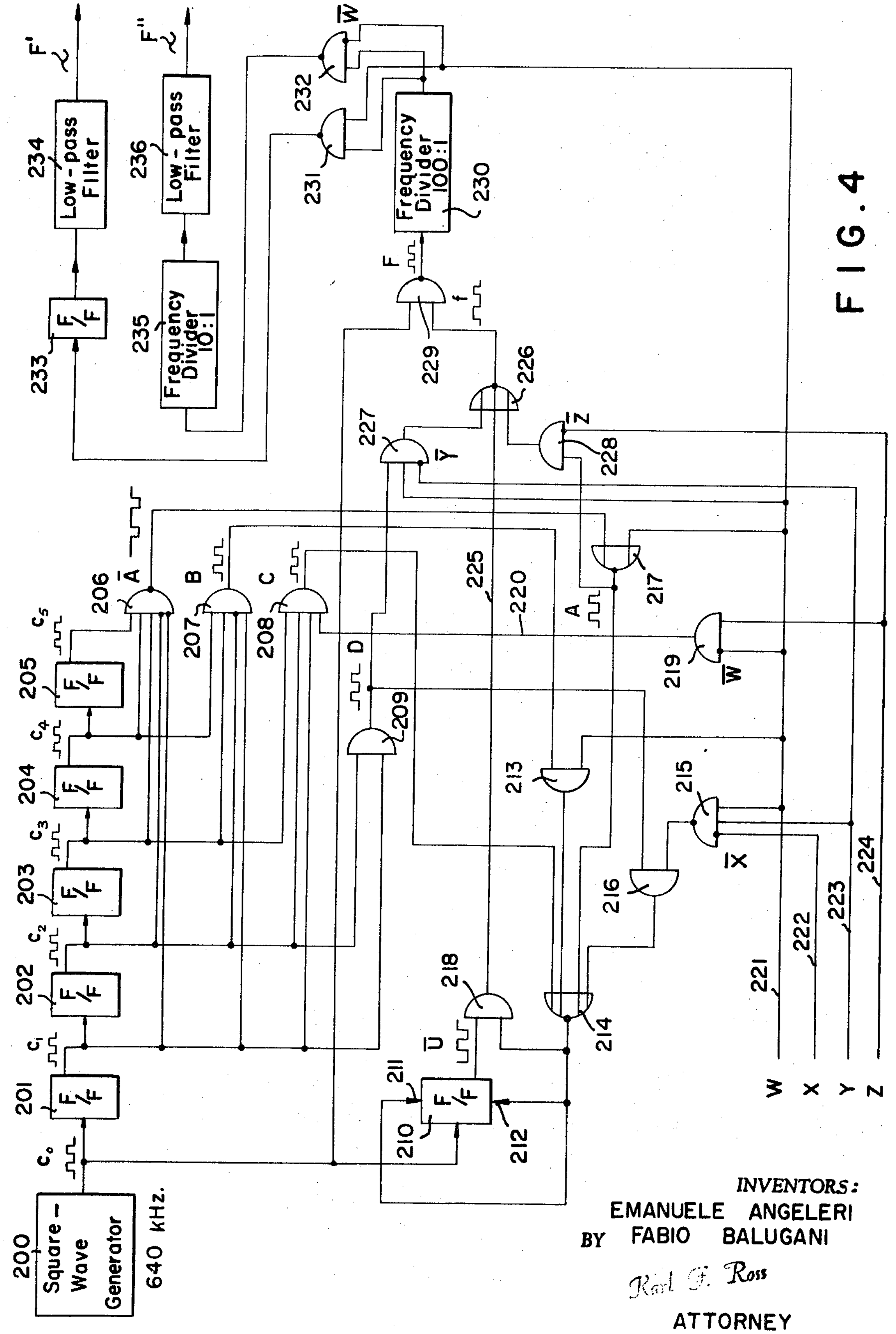
FIG. 4 is a circuit diagram showing another digital frequency modulator according to our invention.

The embodiment shown in FIG. 4 utilizes a square-wave generator 200, similar to generator 100 of FIG. 1, to produce the original square wave $c_o$ of frequency $2/T_o$. This square wave is transmitted to a set of five cascaded flip-flops 201, 202, 203, 204, 205 acting as frequency halvers. The set outputs of these flip-flops carry respective square waves $c_1, c_2, c_3, c_4, c_5$ of progressively lower frequencies $1/T_o$, $½T_o$, $¼T_o$, $⅛T_o$, $1/16T_o$ These outputs are selectively combined, partly with inversion, in a NAND gate 206 generating a series of keying pulses $\overline{A}$, an AND gate 207 giving rise to a series of keying pulses B of the same width as pulses $\overline{A}$ but with double the cadence thereof, an AND gate 208 producing a series of keying pulses C of like width and four times the cadence of pulses $\overline{A}$, and an AND gate 209 whose output is a series of keying pulses D again of the width of pulses $\overline{A}$ but with eight times their cadence. The width of all these pulses equals $T_o/2$, i.e. the pulse width of wave $c_1$, while the repetition frequencies of pulses D, C, B and $\overline{A}$ respectively correspond to those of waves $c_2, c_3, c_4$ and $c_5$.

Another flip-flop 210 is energized from generator 200 in parallel with flip-flop 201 to produce a pulse sequence $\overline{U}$ in its reset output. Flip-flop 210 has two enabling inputs 211, 212 which, in the absence of a finite voltage thereon, prevent its switching from one state of conductivity to the other in response to the pulses of wave $c_o$. Normally, i.e. with inputs 211 and 212 energized, wave $\overline{U}$ is the inversion of wave $c_1$ which therefore may be considered the basic wave $U_o$.

Four leads 221, 222, 223, 224 carry respective switching signals W, X, Y and Z. Signal W is fed, together with pulse sequence B, to an AND gate 213 working into a NOR gate 214. A NAND gate 215 receives the signals W and Y together with the inverted signal $\overline{X}$ from conductor 222; the output of this NAND gate is delivered to an AND gate 216 along with pulse sequence D. AND gate 216 also works into NOR gate 214 which additionally receives the pulse sequence C directly from AND gate 208. A NOR gate 217 has inputs connected to conductor 221 and AND gate 206, thereby generating a pulse train A in the absence of signal W; the pulses A are likewise fed to NOR gate 214. The output of the latter NOR gate is applied to enabling inputs 211, 212 and, in parallel therewith, to a further AND gate 218 also receiving the pulse sequence $\overline{U}$ from flip-flop 210.

Yet another AND gate 219, with a direct input connected to lead 224 and an inverting input connected to lead 221, has an output lead 220 terminating at AND gate 208 to enable the generation of pulse sequence C only in the presence of a signal Z and the concurrent absence of a signal W.

AND gate 218 has an output lead 225 extending to a NOR gate 226 which also receives the outputs of two AND gates 227, 228. Gates 227 and 228 have inverting inputs respectively connected to leads 223 and 224 for detecting signals $\overline{Y}$ and $\overline{Z}$. AND gate 227 also receives the signals D and W while AND gate 228 receives the pulses A from gate 217. NOR gate 226 works into a NAND gate 229 which also receives the original square wave $c_o$ directly from generator 200. AND gate 226 emits an irregular pulse sequence of mean cadence $f$ as more fully described hereinafter.

The output of NAND gate 229, another irregular pulse sequence of mean cadence F, steps a frequency divider 230, which may be generally similar to divider 120 of FIG. 7, having a step-down ratio of 100:1. The output of this divider is supplied in parallel to two NAND gates 231, 232 also connected, directly in the case of gate 231 and invertingly in the case of gate 232, to lead 221. Gate 231 energizes a flip-flop 233, acting as a frequency halver, whose output traverses a low-pass filter 234 which transforms the square-wave output of the flip-flop into a sine wave F'. The output of NAND gate 232 is reduced in frequency by a divider 235, of step-down ratio 10:1, before traversing a low-pass filter 236 emitting a sine wave F''.

FIG. 5 shows, by way of example, the various numerical values which the frequencies F, F', F'' can assume in the presence of different combinations of switching signals W, X, Y, Z. Square-wave generator 200 is assumed to have an operating frequency of 640 kHz which, in the uninhibited condition of flip-flop 210, is translated into a basic frequency $F_o$ of 320 kHz in the outputs of AND gate 218, NOR gate 226 and NAND gate 229. In the embodiment shown, however, this frequency $F_o$ never persists for more than a few cycles, being always modulated by the super position of one or more keying pulses A, B, C, D.

As indicated in the first column of the table of FIG. 5, signal W is used to generate an output frequency F' in filter 234 of FIG. 4, the absence of this signal serving to produce an output frequency F'' in filter 236. Signals X and Y are used to select different values for frequency F' whereas signal Z has the same function in regard to signal Z''. An asterisk (*) in the second, third or fourth column indicates that the presence or absence of the signal X, Y or Z is immaterial for the corresponding switching function.

As further shown in the table, and as will be apparent from the preceding description, pulse trains A, B, C and D have repetition frequencies of 10, 20, 40 and 80 kHz, respectively. From the basic frequency $F_o = 320$ kHz we can derive a first intermediate frequency $F_1 = 260$ kHz by additive superposition of pulse train B (+20 kHz) and subtractive superposition of pulse train D (−80 kHz). Upon step-down in dividers 230 and 233, a signal frequency F' of 1,300 Hz results.

If the frequency component of −80 kHz is omitted, the intermediate frequency in the output of NAND gate 229 rises to the value $F_2 = 340$ kHz which corresponds to an output frequency F' of 1,700 Hz.

If pulse train D is superimposed additively rather than subtractively to provide a frequency component of +80 kHz, the intermediate frequency becomes $F_3 = 420$ kHz with a resulting signal frequency F' of 2,100 Hz.

The additive superposition of pulse trains A, C and D upon basic frequency $F_o$ yields an intermediate frequency $F_4 = 450$ kHz; with $W = 0$, this pulse sequence is routed through NAND gate 232 rather than 231 so as to be stepped down in dividers 235 and 236 to a signal frequency F'' of 450 Hz.

Finally, a reversal in the polarity of pulse train A and a blocking of pulse train C converts the frequency $F_4$ into $F_5 = 390$ kHz corresponding to an output frequency F'' of 390 Hz.

In practice, the alteration between frequencies of 1,300 and 1,700 Hz may be used for the transmission of telegraphy signals, at a rate of 600 bauds, on a first channel while the frequencies of 1,300 and 2,100 Hz may be similarly used on a second message channel operating at 1,200 bauds; the two frequencies F'' may be used for the transmission of supervisory signals in a monitoring channel. Thus, signal W serves for switching between message transmission and monitoring; signal Z carries the information to be transmitted via the supervisory channel; signal X serves to select one or the other message channel; and signal Y carries the data to be transmitted over the selected message channel.

Figure 6:
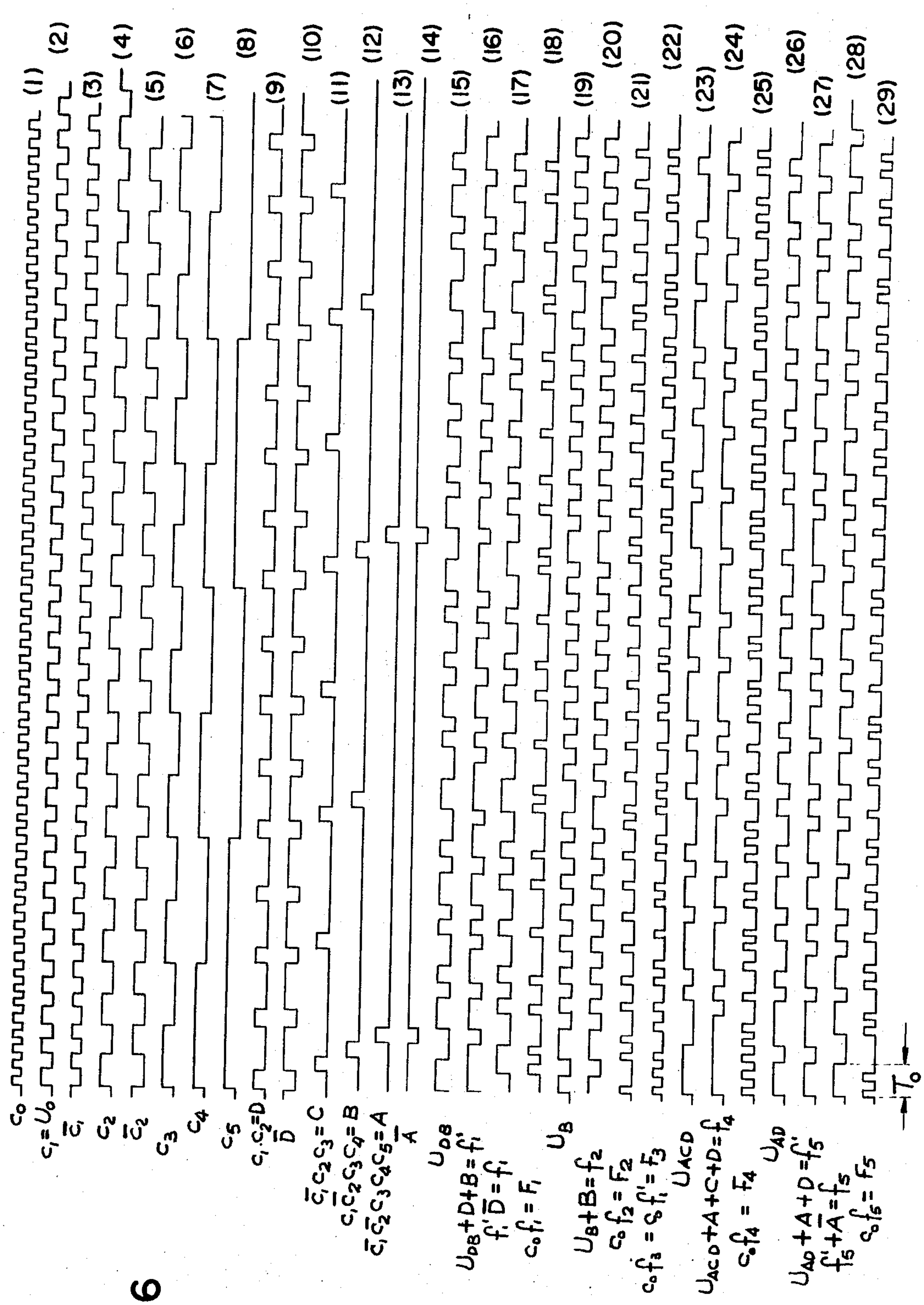
FIG. 6 is a set of graphs serving to explain the operation of the system of FIG. 4.

In FIG. 6 we have shown the correlation between the several pulse trains $c_o$, $c_1 - c_5$, A, B, C, D and $F_1 - F_5$, together with corresponding pulse trains $f_1 - f_5$ in the output of gate 226 (FIG. 4), inversions $\bar{c}_1$, $\bar{c}_2$ (appearing at the inverting inputs of gates 206 and 207) as well as inversion $\bar{A}$. Other graphs show the output of flip-flop 210 (as it would appear after reinversion in gate 226) as modified by pulses issuing from NOR gate 214, i.e. a pulse sequence $U_{DB}$ generated in the presence of pulse trains B and D, another sequence $U_B$ generated in the presence of pulse train B only, a further sequence $U_{ACD}$ generated in the presence of pulse trains A, C and D, and a final sequence $U_{AD}$ generated in the presence of pulse trains A and D.

From FIG. 6 it will furthermore be apparent that pulse train D represents the logical product $c_1c_2$ whereas pulse trains C, B and A are the products $\bar{c}_1c_2c_3$, $c_1\bar{c}_2c_3c_4$ and $\bar{c}_1\bar{c}_2c_3c_4c_5$, respectively.

The logical sum $U_{DB} + D + B$ yields a preliminary frequency $f_1'$ in the input of NOR gate 226 which derives from it the frequency $f_1$ as the logical product $f_1'\bar{D}$, i.e. with subtractive superposition of pulses D. Frequency $F_2$ is the logical sum $U_B + B$ whereas $f_3 = f_1'$. Frequency $f_4$ is the logical sum $U_{ACD} + A + C + D$. The logical product $U_{AD} + A + D$ yields a preliminary frequency $f_5'$, which by subtractive superposition of signal A (logical product $f_5'\bar{A}$) produces the frequency $f_5$. Intermediate frequencies $F_1 - F_5$ are the logical products of pulses $f_1 - f_5$ and signal $c_o$.

To synthesize the frequency $f_1$, therefore, it is first necessary to produce the frequency $f_1'$ which requires the transmission of pulse trains B and D to NOR gate 214. The presence of signal W and the absence of signal X cause the opening of gates 213 and 216 to transmit these pulse trains to gate 214. The arrival of either type of pulse at that NOR gate removes the enabling potential from flip-flop 210 which is therefore prevented from switching in response to a trigger pulse of wave $c_o$ arriving immediately thereafter; it will be understood that the blocking effect of the pulses applied to NOR gate 214 may be extended, if necessary, with the aid of suitable delay means such as, for example, an RC network in the input of the flip-flop. The pulses A, B, C, D are staggered, owing to the inversion of certain inputs of AND gates 206 and 207, by intervals $T_o/2$ representing successive cycles of original square wave $c_o$. In the first two cycles of that square wave, accordingly, pulses D, C, B and A follow one another in immediate succession. Pulses D and B occur, therefore, in the first two cycles of basic wave $c_1 = U_o$ shown at left in FIG. 6; this results in a broadening of the corresponding cycles of output U of flip-flop 210 as illustrated by the graph $U_{DB}$. The first pulse D, coinciding with the broadened pulse at the beginning of graph $U_{BD}$, is ineffectual; the first pulse B, however, coincides with the broadened first space of graph $U_{BD}$ and further lengthens the initial pulse of train $f_1'$ resulting from the superposition of trains $U_{DB}$, D and B in gate 218.

If nothing further is done to the pulse sequence thus obtained, i.e. if AND gate 227 is blocked by a signal Y + 1 (AND gate 228 being closed by the energization of NOR gate 217 with a signal W which must be present to clear the pulses B through gate 213), the output $f$ of NOR gate 226 has the value $f_1' = f_3$ which generates the frequency $F_3$ and a signal wave F' of 2100 Hz. To produce a signal wave F' of 1,300 Hz, signal Y must disappear so that pulses D are also transmitted to NOR gate 226 where they are subtractively superimposed upon wave $f_1'$. This shortens some of the lengthened pulses of wave $f_1'$ so that the mean pulse cadence in train $F_1$ is reduced in comparison with the otherwise identical train $F_3$.

Pulse sequences $F_2$, $F_4$ and $F_5$ are produced in an analogous manner.

It will be observed that the combination of flip-flop 210 with AND gate 218 halves not only the square-wave frequency $c_o$ but also the modulating frequencies of trains A, B, C, D. Pulses B, for example, recur with a period of $8T_o$ so that, according to the notation adopted above, $n = 8$. The pulse sequence $F_2$ resulting from the modulation of basic train $U_o$ with train B has, however, one extra pulse every 16 cycles so that the mean repetition period of this sequence is $(2n/2n+1)T_o$; with subtractive combination, similarly, the period would equal $(2n/2n-1)T_o$. Thus, a single train of keying pulses together with a phase-reversing signal (as described in connection with FIG. 1) could be used to generate three signal frequencies in the ratio of $(2n+1):2n:(2n-1)$.

Since all these signal frequencies are originally generated as square waves in the outputs of bistable circuits, they do not contain any even harmonics of significant amplitudes and can therefore be readily converted into sine waves with the aid of simple low-pass filters.

We claim:

1. A digital frequency modulator comprising a source of equispaced pulses constituting a basic pulse train; logical circuitry for superimposing upon said basic pulse train a modulating pulse train with a cadence subharmonically related to the cadence of said basic pulse train, thereby producing a modified pulse sequence with a number of pulses per unit of time algebraically related to the cadences of said basic and modulating pulse trains; a step-down circuit with a multiplicity of cascaded binary stages connected to receive said pulse sequence from said logical circuitry for converting same into an output square wave with a mean frequency lower than the cadence of said modulating pulse train, said frequency being determined by said number of pulses; and input means for selectively activating said logical circuitry to vary said frequency.

2. A frequency modulator as defined in claim 1, further comprising bistable means periodically triggerable by said step down circuit.

3. A frequency modulator as defined in claim 1 further comprising filter means for isolating a fundamental sine wave from said output square wave.

4. A frequency modulator as defined in claim 1 wherein said source comprises oscillator means for generating an original square wave and multistage frequency-dividing means driven by said oscillator means for producing said basic pulse train as a regular succession of pulses with a cadence subharmonically related to the frequency of said original square wave, said logical circuitry including coincidence means connected to different stages of said frequency-dividing means for creating said modulating pulse train as a series of keying pulses with a pulse width substantially smaller than half their recurrence period and ranging between one and three times the pulse width of said basic pulse train.

5. A frequency modulator as defined in claim 4 wherein said frequency-dividing means includes a first stage for deriving from said original square wave a second square wave of half the frequency of the former, said oscillator means and said first stage being connected to energize said coincidence means for producing said basic pulse train with a pulse width equal to that of said original square wave and with a cadence equaling four times the frequency of said square wave, said keying pulses having a width equaling the repetition period of said basic pulse train and a recurrence period equal to a multiple of said - train and a recurrence period equal to a multiple of repetition period, said coincidence means being connected to superimpose said keying pulses upon the output of said first stage in phased relationship to alter the number of pulses per recurrence period in said basic pulse train.

6. A frequency modulator as defined in claim 5 wherein said logical circuitry includes phase-inverting means for said keying pulses, said input means comprising signaling means for selectively operating said phase-inverting means whereby said number of pulses is alternately reduced and increased.

7. A frequency modulator as defined in claim 4 wherein said oscillator means comprises a square-wave generator of frequency $2/T_o$, said frequency-dividing means including a plurality of cascaded binary dividers and flip-flop means in parallel therewith, said coincidence means comprising a first gate circuit for forming logical products of the outputs of several of said dividers to generate said series of keying pulses of pulse width $T_o/2$ and recurrence period $2^k T_o$ where $k$ is an integer, and a second gate circuit for superimposing said keying pulses upon the output of said flip-flop means, the latter output being a square wave of frequency $\frac{1}{2}T_o$ and pulse width $T_o/2$.

8. A frequency modulator as defined in claim 7 wherein said flip-flop means is provided with a blocking circuit connected to said first gate circuit for preventing a switching of said flip-flop means in response to the output of said generator in the presence of a keying pulse, said second gate circuit comprising gate means connected to form the logical sum of said keying pulses and the outputs of said flip-flop means and said generator, thereby giving rise to an irregular succession of pulses of width $T_o/4$.

9. A frequency modulator as defined in claim 8 wherein said second gate circuit includes inversion means for selectively reversing the phase of said keying pulses with reference to said outputs of said flip-flop means and said generator, thereby varying the mean pulse cadence in said irregular succession.

10. A frequency modulator as defined in claim 7 wherein said first gate circuit comprises a plurality of AND gates for producing several series of keying pulses, said AND gates being partly provided with inverting inputs connected to stagger the keying pulses of different series, with progressively higher values of $K$, by a pulse width $T_o/2$.

* * * * *